Nov. 6, 1951  J. O. SABIN ET AL  2,574,293
FISHING SPINNER
Filed June 28, 1946  2 SHEETS—SHEET 1
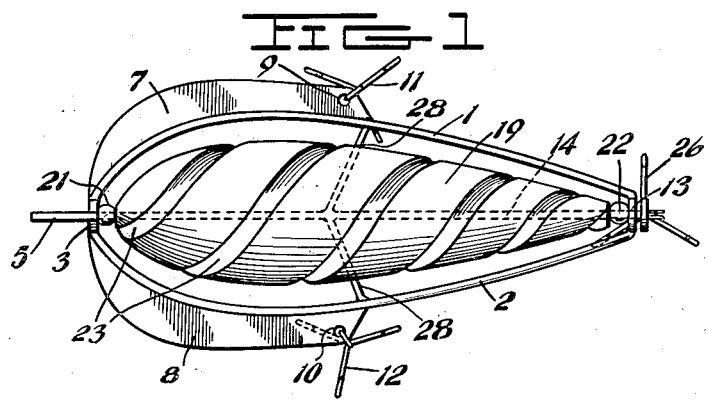
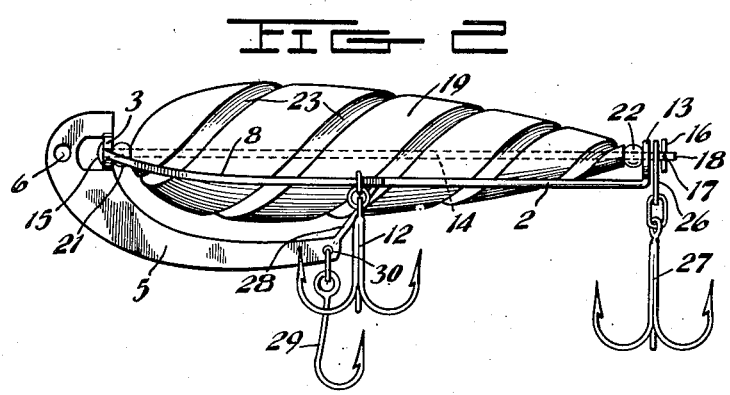
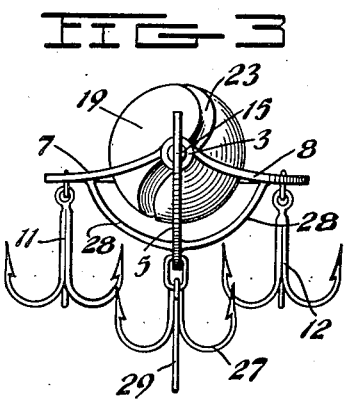
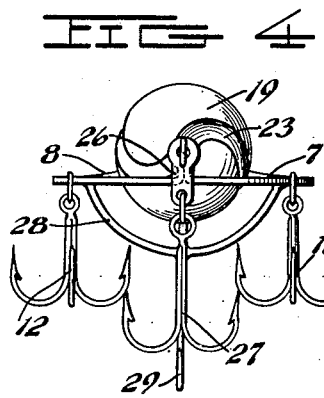
Inventors
James O. Sabin
George E. Ericson
By Clarence A. O'Brien
and Harvey B. Jacobson
Attorneys Nov. 6, 1951 J. O. SABIN ET AL 2,574,293
FISHING SPINNER
Filed June 28, 1946 2 SHEETS—SHEET 2
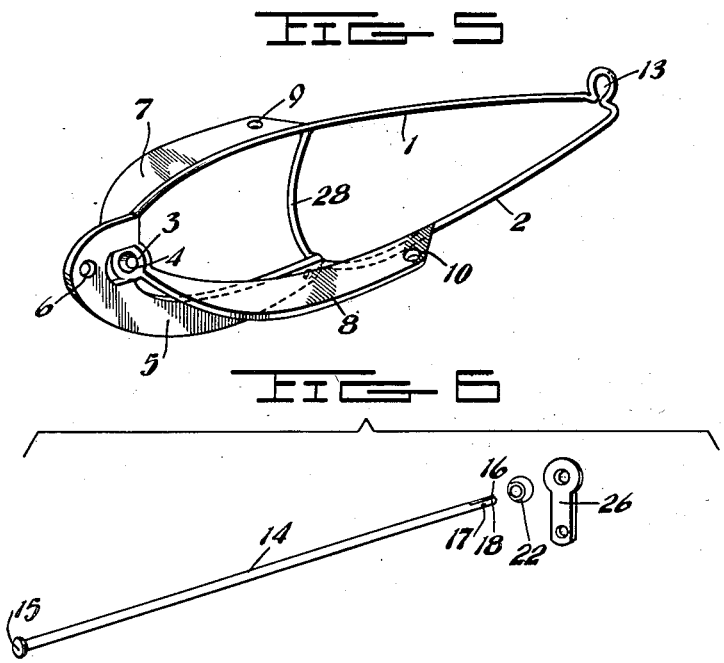
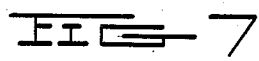
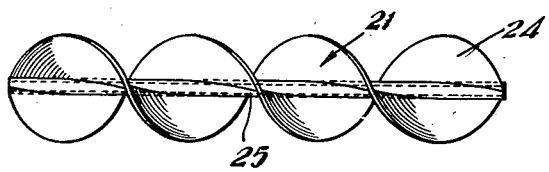
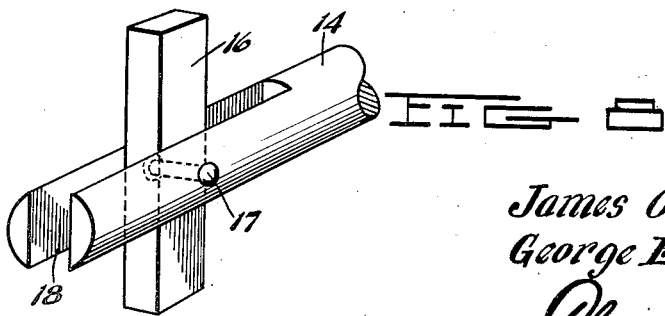
Inventors
James O. Sabin
George E. Ericson
By Clarence A. O'Brien
and Harvey B. Jacobson
Attorneys Patented Nov. 6, 1951

2,574,293

UNITED STATES PATENT OFFICE 2,574,293

FISHING SPINNER

James O. Sabin and George E. Ericson,
Dalbo, Minn.

Application June 28, 1946, Serial No. 680,308

12 Claims. (Cl. 43—42.12)

This invention relates to improvements in fishing spinners.

An object of the invention is to provide an improved form of fishing spinner which will include a frame member having means for selectively supporting therein various forms of plugs or spinners.

Another object of the invention is to provide an improved form of fishing spinner having an elongated frame provided with a centrally disposed depending fin or web and cooperating oppositely disposed laterally extending fins or webs, said spinner having means whereby the same may be attached to a fishing line, and additional means for detachably supporting different forms of plugs or spinners.

A further object of the invention is to provide an improved fishing spinner having means for holding the same on an even keel while being pulled through the water, said means being adapted to support a plurality of multiple prong fish hooks, and means for interchangeably supporting and locking various forms of plugs or spinners upon the improved fishing spinner.

Another object of the invention is to provide an improved fishing spinner with detachable and interchangeable plugs or spinners which will be highly efficient in operation, and relatively inexpensive to manufacture and produce.

Other objects will appear as the description proceeds.

In the accompanying drawings which form a part of this application,

Figure 1 is a plan view of the improved fishing spinner;

Figure 2 is a side elevation of the improved fishing spinner;

Figure 3 is a front elevation of the improved fishing spinner;

Figure 4 is a rear elevation of the improved fishing spinner;

Figure 5 is a perspective view of the spinner frame;

Figure 6 is an exploded view of the plug or spinner supporting shaft with locking means therefor;

Figure 7 is a side elevation of a modified form of interchangeable plug or spinner, and Figure 8 is a perspective view of the end of the spinner supporting shaft showing a pivoted lock supported thereon.

Like characters of reference are used throughout the following specification and the accompanying drawings to designate corresponding parts.

In carrying out the invention, there is provided a novel form of fishing spinner including an elongated frame having oppositely disposed arcuate frame forming wires 1 and 2 which are connected at their forward ends to the bearing collar 3 in which the rounded seat 4 is disposed.

The collar 3 integrally supports the U-shape forward end of the centrally disposed vertical arcuate fin or web 5 secured to the upper and lower edges of said collar 3 and extending forwardly, thence downwardly and rearwardly therefrom. An aperture 6 will be formed through the forward end of the fin or web 5 to receive and support a fishing line (not shown).

A pair of oppositely extending arcuate fins or webs 7 and 8 will be secured to the opposite side edges of the collar 5 and also to the frame wires 1 and 2, to extend laterally therefrom and are bevelled off at their rear ends, extending approximately half the length of said frame. Apertures 9 and 10 are formed through the rear ends of the fins or webs 7 and 8, and will support the multiple pronged fish hooks 11 and 12 respectively. As seen from Figure 3 of the drawings, the forward ends of the laterally extending fins or web 7 and 8 are slightly arcuate in cross-section, and are extended upwardly as they extend forwardly, to provide a lifting action to maintain the plug or spinner upon the surface of the water.

The forward end of the frame is bowed outwardly more than the rear end thereof, said rear end converging to terminate in the upwardly extending eye 13, which cooperates with the interchangeable plug or spinner supporting shaft 14 having a rounded head 15 on its forward end, which is adapted to be received in the rounded seat 4 in the forwardly disposed bearing collar 3, while its rear end is adapted to extend through said eye 13, and to be locked in position by means of the pivoted arm 16 mounted on the pin 17 extending transversely of the slotted rear end 18 of said shaft 14, as clearly illustrated in Figure 8 of the drawings.

It is understood that various forms of plugs or spinners 19 may be interchangeably supported on the shaft 14 by lining the arm 16 with the shaft 14, and removing the same from the eye 13, thereupon, one plug or spinner may be removed, and another different form of plug or spinner placed on the shaft 14 and secured in position. Bearing beads 21 and 22 will be disposed about the shaft 14 adjecent the opposite ends of the plugs or spinners to facilitate the easy rotation thereof on said supporting shaft as the spinner is drawn through the water.

The plug or spinner 19 shown in Figures 1 to 4 inclusive of the drawings, will conform to the general shape of the frame, and will be formed with a spiral groove 23 about its periphery to assist in rotating said spinner on the shaft 14 and the spinner drawn through the water at the end of a fishing line.

The plug or spinner 21 will be formed of one or more coiled blades 24 which will be soldered to the tube 25 disposable about the shaft 14, and may be made partly of copper or brass and partly of chrome or nickle to provide a bright color combination which will readily attract fish to the spinner.

A link 26 will be disposed over the rear end of the shaft 14 rearwardly of the eye 13, and will support the multiple barb fishing hooks 27.

An arcuate reinforcing wire 28 will be connected to the wires 1 and 2 and to the rear end of the fin or web 5 to reinforce the frame for the improved fishing spinner, and a single hook 29 will be secured in an aperture 30 formed through the rear end of said fin or web 5 to hang therebelow.

When it is desired to substitute one plug or spinner for another, it is only necessary to align the end lock on the shaft 14, and move the shaft forwardly freeing it from the eye 13, after which the plug or spinner may be removed from the shaft and another plug or spinner placed thereon, and locked in position between the forward bearing collar 3 and the rear bearing eye 13 on the frame.

Since the fins and stabilizers of the spinner frame are positioned below the center of gravity, the line will not twist or spin as the same is pulled through either smooth or rough water.

From the foregoing description, it will be apparent that there has been devised a highly efficient form of fishing spinner which will utilize a frame having means for interchangeably supporting a series of differently formed plugs or spinners, thereby making it unnecessary for a fisherman to carry a large number of complete fishing spinners with him, one frame and a number of interchangeable spinner bodies being sufficient to answer the purposes.

While the preferred embodiment of the instant invention has been illustrated and described, it will be understood that it is not intended to limit the scope of the invention thereto, as many minor changes in detail of construction may be resorted to without departure from the spirit of the invention.

Having thus described our invention what we claim as new and desire to secure by Letters Patent of the United States is:

1. In a fishing lure, a frame having laterally extending arcuate wire members shaped to form an eye at the rear end thereof, a collar secured to the forward end of said wire members, fins secured to the forward portion of said frame, a shaft extending longitudinally of said frame said shaft being adapted to have spinners of different types mounted thereon.

2. In a fishing lure, a frame having laterally extending arcuate wire members shaped to form an eye at the rear end thereof, a collar secured to the forward end of said wire members, rearwardly extending fins secured to said collar extending laterally and vertically therefrom, a shaft in said frame, said shaft being adapted to have spinners of different types mounted thereon.

3. In a fishing lure, a frame having laterally extending arcuate wire members shaped to form an eye at the rear end thereof, a collar secured to the forward end of said wire members, rearwardly extending fins secured to said collar extending laterally and vertically therefrom, a shaft in said frame, said shaft being adapted to have spinners of different types mounted thereon, and means for locking said spinners in position.

4. In a fishing lure, a frame having laterally extending arcuate wire members adapted to form an eye at the rear end thereof, a collar secured to the forward end of said wire members, rearwardly extending fins secured to said collar extending laterally and vertically therefrom, a shaft in said frame, said shaft being adapted to have spinners of different types mounted thereon, bearing means on said shaft at the end of said spinner, and means for locking said spinners pivoted on said shaft.

5. In a fishing lure, a frame having laterally extending wire members shaped to form an eye at the rear end thereof, a collar secured to the forward end of said wire members, rearwardly extending fins secured to said collar extending laterally and vertically therefrom, a releasable shaft in said frame, said shaft being adapted to have spinners of different types mounted thereon, bearing means for said spinners, said fins being adapted to engage a fish line, and fish hooks secured to the rear extremities of said fins and to the rear of said shaft.

6. In a fishing lure, a frame having laterally extending arcuate wire members shaped to form an eye at the rear end thereof, a collar secured to the forward end of said wire members, rearwardly extending fins secured to said collar extending laterally and vertically therefrom, bracing means connecting the rear ends of said fins, a socket formed in said collar, a shaft disposable between the socket in the collar and said eye, said shaft being adapted to have spinners of different types mounted thereon.

7. The subject matter as claimed in claim 6, and a pivoted locking arm on the end of said shaft.

8. In a fishing lure, a frame having laterally extending arcuate wire members shaped to form an eye at the rear end thereof, an apertured collar secured on the forward end of said wire members, a headed shaft extending through said collar and eye, the headed portion abutting said collar, and the portion of said shaft extending through said eye being slotted, said shaft being adapted to have spinners of different types mounted thereon, and a pivoted locking bar secured in said slotted end of the shaft to retain said spinner on said shaft.

9. In a fishing lure, a frame having laterally extending arcuate wire members shaped to form an eye at the rear end thereof, an apertured collar secured on the forward end of said wire members, a centrally disposed arcuate fin secured to said collar and extending rearwardly therefrom, a headed shaft extending through said collar and eye, the headed portion abutting said collar, and the portion of said shaft extending through said eye being slotted, said shaft being adapted to have spinners of different types mounted thereon, and a pivoted locking bar secured in said slotted end of the shaft to retain said spinner on said shaft.

10. The combination of claim 9, wherein said fin includes a U-shaped forward end secured to the upper and lower edges of the collar and means in said U-shaped end to receive a fishing line.

11. In a fishing lure, a frame having laterally extending arcuate wire members shaped to form an eye at the rear end thereof, rearwardly and laterally extending fins secured to said collar, said fins being arcuate in cross-section, arcuate bracing means connecting the rear ends of said fins, an apertured collar secured on the forward end of said wire members, a headed shaft extending through said collar and eye, the headed portion abutting said collar, and the portion of said shaft extending through said eye being slotted, said shaft being adapted to have spinners of different types mounted thereon, and a pivoted locking bar secured in said slotted end of the shaft to retain said spinner on said shaft.

12. A fishing lure comprising an elongated open frame substantially lenticular shaped having forward and rear ends, a spinner rotatably supported within said open frame, a pair of substantially horizontal laterally extending fins attached to said frame, the forward ends of which are curved upwardly for supporting the forward end of the frame as the latter is pulled through a fluid medium, an arcuate vertical fin attached to the forward end of the frame and extending downwardly and rearwardly therefrom below the open frame to clear a spinner supported in the open frame, fish hooks supported by said fins and the rear end of the frame, and a U-shaped member transversely disposed relative to the frame and connecting the substantially horizontal and vertical fins intermediate the ends of the frame.

JAMES O. SABIN.
GEORGE E. ERICSON.

REFERENCES CITED

The following references are of record in the file of this patent:

UNITED STATES PATENTS

| Number | Name | Date |
|---|---|---|
| 576,680 | Kittle | Feb. 9, 1897 |
| 2,078,816 | Shenitz | Apr. 27, 1937 |
| 2,190,791 | Larson | Feb. 20, 1940 |
| 2,306,692 | Flood | Dec. 29, 1942 |
| 2,389,423 | Evans | Nov. 20, 1945 |

FOREIGN PATENTS

| Number | Country | Date |
|---|---|---|
| 748,370 | France | Apr. 10, 1933 |